(12) United States Patent
Wang

(10) Patent No.: US 11,231,811 B2
(45) Date of Patent: Jan. 25, 2022

(54) TOUCH RECOGNITION METHOD, TOUCH DEVICE

(71) Applicant: BOE TECHNOLOGY GROUP CO., LTD., Beijing (CN)

(72) Inventor: Tao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 167 days.

(21) Appl. No.: 16/471,362

(22) PCT Filed: Nov. 9, 2018

(86) PCT No.: PCT/CN2018/114837
§ 371 (c)(1),
(2) Date: Jun. 19, 2019

(87) PCT Pub. No.: WO2019/091455
PCT Pub. Date: May 16, 2019

(65) Prior Publication Data
US 2019/0391723 A1 Dec. 26, 2019

(30) Foreign Application Priority Data
Nov. 13, 2017 (CN) .......................... 201711115731.0

(51) Int. Cl.
*G06F 3/041* (2006.01)
(52) U.S. Cl.
CPC ................ *G06F 3/04186* (2019.05)
(58) Field of Classification Search
CPC ...... G06F 3/041; G06F 3/0412; G06F 3/0418; G06F 3/04186; G06F 3/0481; G06F 3/04816; G06F 2203/04104

USPC .......................................................... 345/173
See application file for complete search history.

(56) References Cited

U.S. PATENT DOCUMENTS

| 10,402,005 B2* | 9/2019 | Yang .................... G06F 3/04186 |
| 2007/0152976 A1 | 7/2007 | Townsend et al. |
| 2014/0049502 A1* | 2/2014 | Santos .................... G06F 3/038 |
| | | 345/174 |

(Continued)

FOREIGN PATENT DOCUMENTS

| CN | 103513917 A | 1/2014 |
| CN | 104020916 A | 9/2014 |

(Continued)

OTHER PUBLICATIONS

First Office Action dated Dec. 13, 2019, for corresponding Chinese application 201711115731.0.

(Continued)

*Primary Examiner* — Jason M Mandeville
(74) *Attorney, Agent, or Firm* — Nath, Goldberg & Meyer; Joshua B. Goldberg

(57) ABSTRACT

The present disclosure provides a touch recognition method and a touch device. The touch recognition method is applied to a touch panel including a first touch region, and the method includes: judging whether a position of a first touch is located in the first touch region; and in response to the position of the first touch being located in the first touch region, judging whether the first touch is a mistaken touch or an effective touch according to a type of the first touch region and a parameter of the first touch selected based on the type of the first touch region.

16 Claims, 4 Drawing Sheets

(56) References Cited

U.S. PATENT DOCUMENTS

| | | | | |
|---|---|---|---|---|
| 2015/0084877 A1* | 3/2015 | Wang | ............... | G06F 3/0416 345/173 |
| 2015/0145820 A1* | 5/2015 | Huang | ............... | G06F 3/04883 345/174 |
| 2016/0034046 A1* | 2/2016 | Waddell | ............... | G06F 3/0237 345/173 |
| 2016/0224179 A1* | 8/2016 | Ichihara | ............... | G06F 3/04186 |
| 2016/0357434 A1 | 12/2016 | Kang et al. | | |
| 2017/0277336 A1 | 9/2017 | Yang | | |

FOREIGN PATENT DOCUMENTS

| | | |
|---|---|---|
| CN | 104571693 A | 4/2015 |
| CN | 104571896 A | 4/2015 |
| CN | 105022518 A | 11/2015 |
| CN | 105353901 A | 2/2016 |
| CN | 105487809 A | 4/2016 |
| CN | 105786391 A | 7/2016 |
| CN | 105975160 A | 9/2016 |
| CN | 106325604 A | 1/2017 |
| CN | 106814908 A | 6/2017 |
| CN | 107025024 A | 8/2017 |
| EP | 1659481 A2 | 5/2006 |
| EP | 2077490 A2 | 7/2009 |
| EP | 2947553 A1 | 11/2015 |
| EP | 3062200 A1 | 8/2016 |
| WO | 2014210304 A1 | 12/2014 |

OTHER PUBLICATIONS

International Search Report dated Feb. 14, 2019, of corresponding PCT/CN2018/114837 with English translation.
Extended European Search Report dated Jul. 27, 2021 for application No. EP18876501.0.

* cited by examiner

TOUCH RECOGNITION METHOD, TOUCH DEVICE

CROSS-REFERENCE TO RELATED APPLICATIONS

The present application is a National Phase Application filed under 35 U.S.C. 371 as a national stage of PCT/CN2018/114837, filed Nov. 9, 2018, and claims the priority of Chinese Patent Application No. 20171111573.1, filed on Nov. 13, 2017, the contents of each of which are incorporated herein in their entirety by reference.

TECHNICAL FIELD

The present disclosure relates to the field of touch technology, and in particular, a touch recognition method and a touch device.

BACKGROUND

With development of touch technology, touch panels are applied more and more widely. However, mistaken touch operations are prone to occur in some positions of a touch panel so that normal touch responses of the touch panel may be affected, resulting in an influence on user's interactive experience during using the touch panel.

SUMMARY

An embodiment of the present disclosure provides a touch recognition method for a touch panel including a first touch region, the method including: judging whether a position of a first touch is located in the first touch region; and in response to the position of the first touch being locating in the first touch region, judging whether the first touch is a mistaken touch or an effective touch according to a type of the first touch region and a parameter of the first touch selected based on the type of the first touch region.

In some implementations, the parameter of the first touch includes at least one of a duration time of the first touch and an area of the first touch.

In some implementations, the first touch region is located at an edge of the touch panel.

In some implementations, the first touch region includes a first sub-region of a first type and a second sub-region of a second type, the first type is different from the second type, in response to the position of the first touch being located in the first sub-region of the first touch region, whether the first touch is the mistaken touch or the effective touch is judged according to the parameter of the first touch by a first mode, and in response to the position of the first touch being located in the second sub-region of the first touch region, whether the first touch is the mistaken touch or the effective touch is judged according to the parameter of the first touch by a second mode, and the first mode is different from the second mode.

In some implementations, the parameter of the first touch includes the duration time of the first touch, in response to the position of the first touch being located in the first sub-region of the first touch region, judging whether the first touch is the mistaken touch or the effective touch according to the parameter of the first touch by the first mode including: judging whether the duration time of the first touch is greater than or equal to a first threshold, in response to the duration time of the first touch being greater than or equal to the first threshold, determining the first touch as the mistaken touch; in response to the duration time of the first touch being less than the first threshold, detecting whether a second touch occurs at the position of the first touch during a first predefined period, in response to the second touch occurring at the position of the first touch during the first predefined period, determining the first touch as the effective touch, and in response to the second touch not occurring at the position of the first touch during the first predefined period, determining the first touch as the mistaken touch.

In some implementations, the parameter of the first touch includes the duration time of the first touch, in response to the position of the first touch being located in the first sub-region of the first touch region, judging whether the first touch is the mistaken touch or the effective touch according to the parameter of the first touch by the first mode including: judging whether the duration time of the first touch is greater than or equal to the first threshold, in response to the duration time of the first touch being greater than or equal to the first threshold, determining the first touch as the mistaken touch; in response to the duration time of the first touch being less than the first threshold, detecting whether the second touch occurs at the position of the first touch during the first predefined period, in response to the second touch occurring at the position of the first touch during the first predefined period, determining the first touch as the effective touch, and in response to the second touch not occurring at the position of the first touch during the first predefined period, issuing a reminder signal; detecting whether the second touch occurs at the position of the first touch during a second predefined period subsequent to the reminder signal, in response to the second touch occurring at the position of the first touch during the second predefined period subsequent to the reminder signal, determining the first touch as the effective touch, and in response to the second touch not occurring at the position of the first touch during the second predefined period, determining the first touch as the mistaken touch.

In some implementations, the parameter of the first touch includes the area of the first touch, in response to the position of the first touch being located in the second sub-region of the first touch region, judging whether the first touch is the mistaken touch or the effective touch according to the parameter of the first touch by the second mode including: judging whether a ratio of the area of the first touch to a predefined touch area is greater than or equal to a second threshold, in response to the ratio of the area of the first touch to the predefined touch area being greater than or equal to the second threshold, determining the first touch as the effective touch; in response to the ratio of the area of the first touch to the predefined touch area being less than the second threshold, detecting whether a second touch occurs at the position of the first touch during a first predefined period; in response to the second touch occurring at the position of the first touch during the first predefined period, determining the first touch as the effective touch; and in response to the second touch not occurring at the position of the first touch during the first predefined period, determining the first touch as the mistaken touch.

In some implementations, the parameter of the first touch includes the duration time of the first touch and the area of the first touch, in response to the position of the first touch being located in the second sub-region of the first touch region, judging whether the first touch is the mistaken touch or the effective touch according to the parameter of the first touch by the second mode including: judging whether the ratio of the area of the first touch to the predefined touch area is greater than or equal to the second threshold; in response to the ratio of the area of the first touch to the predefined touch area being greater than or equal to the second threshold, judging whether the duration time of the first touch is greater than or equal to a third threshold, and less than or equal to a fourth threshold; in response to the duration time of the first touch being greater than or equal to the third threshold, and less than or equal to the fourth threshold, determining the first touch as the effective touch; in response to the duration time of the first touch being less than the third threshold or greater than the fourth threshold, determining the first touch as the mistaken touch; in response to the ratio of the area of the first touch to the predefined touch area being less than the second threshold, detecting whether the second touch occurs at the position of the first touch during the first predefined period, in response to the second touch occurring at the position of the first touch during the first predefined period, determining the first touch as the effective touch; and in response to the second touch not occurring at the position of the first touch during the first predefined period, determining the first touch as the mistaken touch.

In some implementations, the parameter of the first touch includes the area of the first touch, in response to the position of the first touch being located in the second sub-region of the first touch region, judging whether the first touch is the mistaken touch or the effective touch according to the parameter of the first touch by the second mode including: judging whether the ratio of the area of the first touch to the predefined touch area is greater than or equal to the second threshold; in response to the ratio of the area of the first touch to the predefined touch area being greater than or equal to the second threshold, determining the first touch as the effective touch; in response to the ratio of the area of the first touch to the predefined touch area being less than the second threshold, detecting whether the second touch occurs at the position of the first touch during the first predefined period; in response to the second touch occurring at the position of the first touch during the first predefined period, determining the first touch as the effective touch; in response to the second touch not occurring at the position of the first touch during the first predefined period, summing the area of the first touch with a predefined compensation area to obtain a compensated area of the first touch; judging whether a ratio of the compensated area of the first touch to the predefined touch area is greater than or equal to the second threshold; in response to the ratio of the compensated area of the first touch to the predefined touch area being greater than or equal to the second threshold, issuing the reminder signal; detecting whether the second touch occurs at the position of the first touch during the second predefined period subsequent to the reminder signal; in response to the second touch occurring at the position of the first touch during the second predefined period, determining the first touch as the effective touch; in response to the second touch not occurring at the position of the first touch during the second predefined period, determining the first touch as the mistaken touch.

In some implementations, the parameter of the first touch includes the duration time of the first touch and the area of the first touch, in response to the position of the first touch being located in the second sub-region of the first touch region, judging whether the first touch is the mistaken touch or the effective touch according to the parameter of the first touch by the second mode including: judging whether the ratio of the area of the first touch to the predefined touch area is greater than or equal to the second threshold; in response to the ratio of the area of the first touch to the predefined touch area being greater than or equal to the second threshold, judging whether the duration time of the first touch is greater than or equal to the third threshold, and less than or equal to the fourth threshold; in response to the duration time of the first touch being greater than or equal to the third threshold, and less than or equal to the fourth threshold, determining the first touch as the effective touch; in response to the duration time of the first touch being less than the third threshold or greater than the fourth threshold, determining the first touch as the mistaken touch; in response to the ratio of the area of the first touch to the predefined touch area being less than the second threshold, detecting whether the second touch occurs at the position of the first touch during the first predefined period, in response to the second touch occurring at the position of the first touch during the first predefined period, determining the first touch as the effective touch; and in response to the second touch not occurring at the position of the first touch during the first predefined period, summing the area of the first touch with the predefined compensation area to obtain the compensated area of the first touch; judging whether the ratio of the compensated area of the first touch to the predefined touch area is greater than or equal to the second threshold; in response to the ratio of the compensated area of the first touch to the predefined touch area being greater than or equal to the second threshold, issuing the reminder signal; detecting whether the second touch occurs at the position of the first touch during the second predefined period subsequent to the reminder signal; in response to the second touch occurring at the position of the first touch during the second predefined period, determining the first touch as the effective touch; and in response to the second touch not occurring at the position of the first touch during the second predefined period, determining the first touch as the mistaken touch.

In some implementations, the type of the first touch region is determined in advance or according to an operation of a user.

In some implementations, determining the type of the first touch region according to the operation of the user including: detecting a type of the operation of the user in the first touch region, and determining the type of the first touch region according to the type of the operation of the user in the first touch region.

In some implementations, the first sub-region of the first type and the second sub-region of the second type of the first touch region are determined in advance or according to the operation of the user.

In some implementations, determining the first sub-region of the first type and the second sub-region of the second type of the first touch region according to the operation of the user including: detecting a first type touch operation of a user in the first touch region, and determining a region in which the first type touch operation of the user occurs as the first sub-region of the first type; and detecting a second type touch operation of the user in the first touch region, and determining a region in which the second type touch operation of the user occurs as the second sub-region of the second type.

In some implementations, the touch panel further includes a second touch region different from the first touch region, the method further including: judging whether the position of the first touch is located in the second touch region; and in response to the position of the first touch being located in the second touch region, determining the first touch as the effective touch.

An embodiment of the present disclosure further provides a touch device, including: a touch panel including a first touch region; a first judging component configured to judge whether a position of a first touch is located in the first touch region; and a second judging component configured to, in response to the first judging component determining that the position of the first touch is located in the first touch region, judge whether the first touch is a mistaken touch or an effective touch according to a type of the first touch region and a parameter of the first touch selected based on the type of the first touch region.

In some implementations, the first touch region includes a first sub-region of a first type and a second sub-region of a second type, the first type is different from the second type, and the second judging component is configured to: in response to the position of the first touch being located in the first sub-region of the first touch region, judge whether the first touch is the mistaken touch or the effective touch according to the parameter of the first touch by a first mode, in response to the position of the first touch being located in the second sub-region of the first touch region, judge whether the first touch is the mistaken touch or the effective touch according to the parameter of the first touch by a second mode, and t first mode is different from the second mode.

In some implementations, the parameter of the first touch includes the duration time of the first touch, the second judging component is configured to: in response to the position of the first touch being located in the first sub-region of the first touch region, judge whether the duration time of the first touch is greater than or equal to a first threshold, in response to the duration time of the first touch being greater than or equal to the first threshold, determine the first touch as the mistaken touch; in response to the duration time of the first touch being less than the first threshold, detect whether a second touch occurs at the position of the first touch during a first predefined period, in response to the second touch occurring at the position of the first touch during the first predefined period, determine the first touch as the effective touch, and in response to the second touch not occurring at the position of the first touch during the first predefined period, determine the first touch as the mistaken touch.

In some implementations, the parameter of the first touch includes the duration time of the first touch, the second judging component is configured to: in response to the position of the first touch being located in the first sub-region of the first touch region, judge whether the duration time of the first touch is greater than or equal to the first threshold, in response to the duration time of the first touch being greater than or equal to the first threshold, determine the first touch as the mistaken touch; in response to the duration time of the first touch being less than the first threshold, detect whether the second touch occurs at the position of the first touch during the first predefined period, in response to the second touch occurring at the position of the first touch during the first predefined period, determine the first touch as the effective touch, and in response to the second touch not occurring at the position of the first touch during the first predefined period, issue a reminder signal; detect whether the second touch occurs at the position of the first touch during a second predefined period subsequent to the reminder signal, in response to the second touch occurring at the position of the first touch during the second predefined period subsequent to the reminder signal, determine the first touch as the effective touch, and in response to the second touch not occurring at the position of the first touch during the second predefined period, determine the first touch as the mistaken touch.

In some implementations, the parameter of the first touch includes the area of the first touch, the second judging component is configured to: in response to the position of the first touch being located in the second sub-region of the first touch region, judge whether a ratio of the area of the first touch to a predefined touch area is greater than or equal to a second threshold, in response to the ratio of the area of the first touch to the predefined touch area being greater than or equal to the second threshold, determine the first touch as the effective touch; in response to the ratio of the area of the first touch to the predefined touch area being less than the second threshold, detect whether a second touch occurs at the position of the first touch during a first predefined period; in response to the second touch occurring at the position of the first touch during the first predefined period, determine the first touch as the effective touch; and in response to the second touch not occurring at the position of the first touch during the first predefined period, determine the first touch as the mistaken touch.

In some implementations, the parameter of the first touch includes the duration time of the first touch and the area of the first touch, the second judging component is configured to: in response to the position of the first touch being located in the second sub-region of the first touch region, judge whether the ratio of the area of the first touch to the predefined touch area is greater than or equal to the second threshold; in response to the ratio of the area of the first touch to the predefined touch area being greater than or equal to the second threshold, judge whether the duration time of the first touch is greater than or equal to a third threshold, and less than or equal to a fourth threshold; in response to the duration time of the first touch being greater than or equal to the third threshold, and less than or equal to the fourth threshold, determine the first touch as the effective touch; in response to the duration time of the first touch being less than the third threshold or greater than the fourth threshold, determine the first touch as the mistaken touch; in response to the ratio of the area of the first touch to the predefined touch area being less than the second threshold, detect whether the second touch occurs at the position of the first touch during the first predefined period, in response to the second touch occurring at the position of the first touch during the first predefined period, determine the first touch as the effective touch; and in response to the second touch not occurring at the position of the first touch during the first predefined period, determine the first touch as the mistaken touch.

In some implementations, the parameter of the first touch includes the area of the first touch, the second judging component is configured to: in response to the position of the first touch being located in the second sub-region of the first touch region, judge whether the ratio of the area of the first touch to the predefined touch area is greater than or equal to the second threshold; in response to the ratio of the area of the first touch to the predefined touch area being greater than or equal to the second threshold, determine the first touch as the effective touch; in response to the ratio of the area of the first touch to the predefined touch area being less than the second threshold, detect whether the second touch occurs at the position of the first touch during the first predefined period; in response to the second touch occurring at the position of the first touch during the first predefined period, determine the first touch as the effective touch; in response to the second touch not occurring at the position of the first touch during the first predefined period, sum the area of the first touch with a predefined compensation area to obtain a compensated area of the first touch; judge whether a ratio of the compensated area of the first touch to the predefined touch area is greater than or equal to the second threshold; in response to the ratio of the compensated area of the first touch to the predefined touch area being greater than or equal to the second threshold, issue the reminder signal; detect whether the second touch occurs at the position of the first touch during the second predefined period subsequent to the reminder signal; in response to the second touch occurring at the position of the first touch during the second predefined period, determine the first touch as the effective touch; in response to the second touch not occurring at the position of the first touch during the second predefined period, determine the first touch as the mistaken touch.

In some implementations, the parameter of the first touch includes the duration time of the first touch and the area of the first touch, the second judging component is configured to: in response to the position of the first touch being located in the second sub-region of the first touch region, judge whether the ratio of the area of the first touch to the predefined touch area is greater than or equal to the second threshold; in response to the ratio of the area of the first touch to the predefined touch area being greater than or equal to the second threshold, judge whether the duration time of the first touch is greater than or equal to the third threshold, and less than or equal to the fourth threshold; in response to the duration time of the first touch being greater than or equal to the third threshold, and less than or equal to the fourth threshold, determine the first touch as the effective touch; in response to the duration time of the first touch being less than the third threshold or greater than the fourth threshold, determine the first touch as the mistaken touch; in response to the ratio of the area of the first touch to the predefined touch area being less than the second threshold, detect whether the second touch occurs at the position of the first touch during the first predefined period, in response to the second touch occurring at the position of the first touch during the first predefined period, determine the first touch as the effective touch; and in response to the second touch not occurring at the position of the first touch during the first predefined period, sum the area of the first touch with the predefined compensation area to obtain the compensated area of the first touch; judge whether the ratio of the compensated area of the first touch to the predefined touch area is greater than or equal to the second threshold; in response to the ratio of the compensated area of the first touch to the predefined touch area being greater than or equal to the second threshold, issue the reminder signal; detect whether the second touch occurs at the position of the first touch during the second predefined period subsequent to the reminder signal; in response to the second touch occurring at the position of the first touch during the second predefined period, determine the first touch as the effective touch; and in response to the second touch not occurring at the position of the first touch during the second predefined period, determine the first touch as the mistaken touch.

In some implementations, the touch device further includes a determining component configured to determine the type of the first touch region in advance or according to an operation of a user.

In some implementations, the determining component is configured to: detect a type of the operation of the user in the first touch region, and determine the type of the first touch region according to the type of the operation of the user in the first touch region.

In some implementations, the touch device further includes a determining component configured to determine the first sub-region of the first type and the second sub-region of the second type of the first touch region in advance or according to the operation of the user.

In some implementations, the determining component is configured to: detect a first type touch operation of a user in the first touch region, and determine a region in which the first type touch operation of the user occurs as the first sub-region of the first type; and detect a second type touch operation of the user in the first touch region, and determine a region in which the second type touch operation of the user occurs as the second sub-region of the second type.

In some implementations, the touch panel further includes a second touch region different from the first touch region, the first judging component is further configured to judge whether the position of the first touch is located in the second touch region; and the second judging component is further configured to, in response to the position of the first touch being located in the second touch region, determine the first touch as the effective touch.

An embodiment of the present disclosure further provides a non-temporary computer readable storage medium which stores a program including executable instructions, the program is executed to perform the touch recognition method in accordance with the embodiment of the present disclosure.

An embodiment of the present disclosure further provides a touch recognition apparatus, including a storage device and a processor, the storage device stores a program including executable instructions, and the program is executed by the processor to perform the touch recognition method in accordance with the embodiment of the present disclosure.

DESCRIPTION OF EMBODIMENTS

In order to make a person skilled in the art understand technical solutions of the present disclosure better, the touch recognition method and the touch device of the present disclosure will be described in detail below in conjunction with accompanying drawings.

It should be noted that, unless otherwise specified, terms "first" and "second" referred to in the present disclosure are used only to distinguish objects in description and do not constitute substantial restrictions on each object. For example, the terms "first" and "second" do not express any order restriction, and in a case where there is no need for descriptive distinctions, the objects modified by the terms "first" and "second" may be the same with each other.

Figure 1:
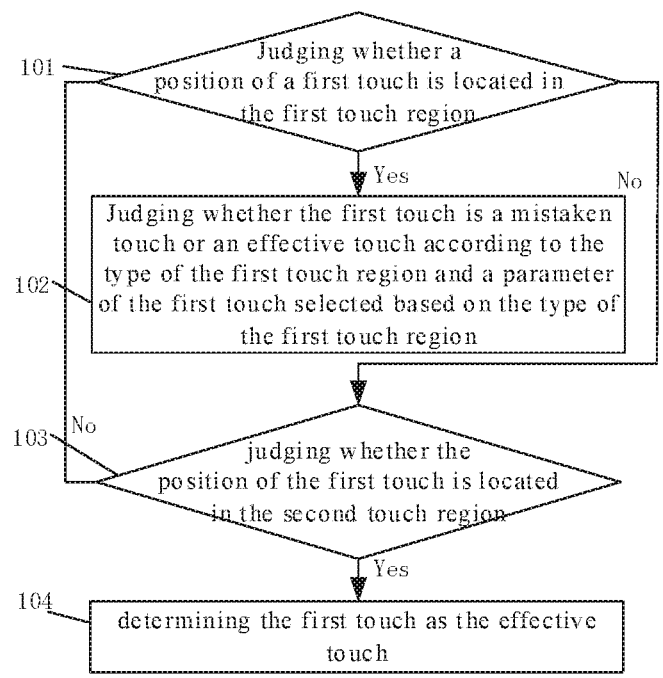
FIG. 1 shows a flow chart of a touch recognition method in an embodiment of the present disclosure.

FIG. 1 shows a flow chart of a touch recognition method in an embodiment of the present disclosure. The touch recognition method of the embodiment is applied to a touch panel including a first touch region. The first touch region may be located at an edge of the touch panel. For example, the first touch region is a region prone to be touched mistakenly. A type of the first touch region may be determined according to a type of a mistaken touch prone to occur in the first touch region.

As shown in FIG. 1, the touch recognition method of the embodiment includes following steps 101 and 102.

At step 101, whether a position of a first touch is located in the first touch region is judged.

The step 102 is performed in response to the position of the first touch being located in the first touch region.

The touch panel of the embodiment may be a touch display panel.

At step 102, whether the first touch is a mistaken touch or an effective touch is judged, in response to the position of the first touch being located in the first touch region, according to the type of the first touch region and a parameter of the first touch selected based on the type of the first touch region.

The parameter of the first touch may include at least one of a duration time of the first touch and an area of the first touch.

In the embodiment, the parameter of the first touch for judging whether the first touch is the mistaken touch or the effective touch may be selected according to the type of the first touch region.

For example, with a certain probability, the type of the mistaken touch prone to occur in the first touch region may be that requiring no response and further processing, or resulting from an incomplete touch action, and the type of the first touch region may be determined according to the type of the mistaken touch prone to occur in the first touch region, the parameter of the first touch is further selected correspondingly and whether the first touch is the mistaken touch or the effective touch is further judged according the parameter of the first touch.

In some implementations, the touch panel may further include a second touch region different from the first touch region, and in such case, the touch recognition method may further include steps 103 and 104. At step 103, whether the position of the first touch is located in the second touch region is judged; and at step 104, the first touch is determined as the effective touch in response to the position of the first touch being located in the second touch region.

The second touch region may be located in a center of the touch panel.

With the touch recognition method of the embodiment, in response to the position of the first touch being located in a region the first touch region) in which the mistaken touch is prone to occur, whether the first touch is the mistaken touch or the effective touch is judged according to the type of the first touch region and the parameter of the first touch selected based on the type of the first touch region, an accuracy of touch response in the region of the touch panel in which the mistaken touch is prone to occur is improved, thereby the user's interactive experience during using the touch panel is improved.

It should be understood that, in response to the first touch being determined as the effective touch, a corresponding response and further processing may be performed, and in response to the first touch being determined as the mistaken touch, no response and further processing may be performed.

Furthermore, with the touch recognition method of the embodiment, in response to the position of the first touch being located in a region (i.e., the second touch region) in which no mistaken touch is prone to occur, the first touch is determined as the effective touch, and the corresponding response and further processing may be performed, a speed of touch response in the region of the touch panel in which no mistaken touch is prone to occur is ensured, thereby the user's interactive experience during using the touch panel is improved.

Figure 2:
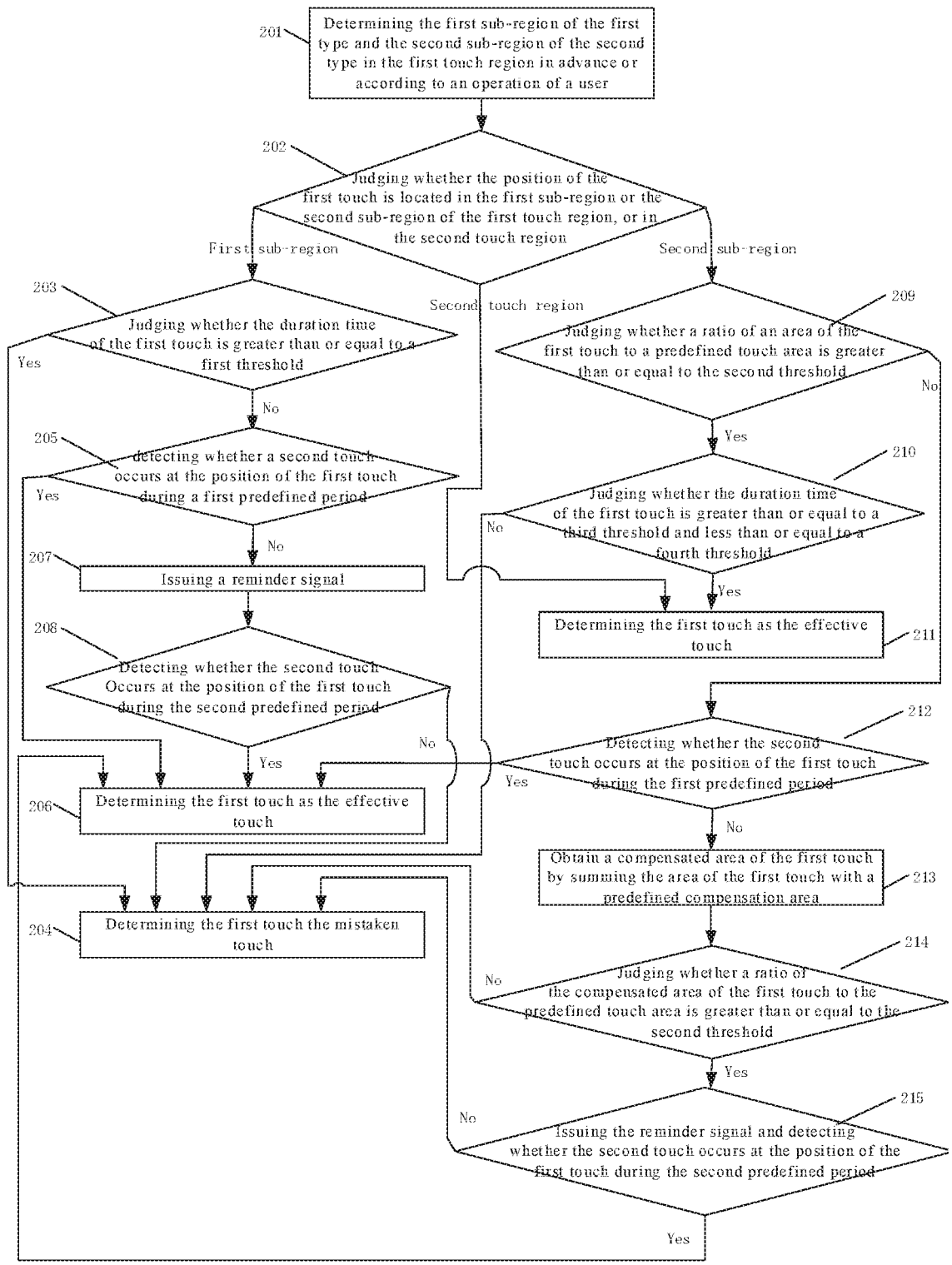
FIG. 2 shows a flow chart of a touch recognition method in an embodiment of the present disclosure.

FIG. 2 shows a flow chart of a touch recognition method in an embodiment of the present disclosure. In the embodiment, the first touch region of the touch panel includes a first sub-region of a first type and a second sub-region of a second type, and the first type is different from the second type. For example, the type of the mistaken touch prone to occur in the first sub-region may be that requiring no response and further processing with a certain probability, and the type of the mistaken touch prone to occur in the second sub-region may be that resulting from an incomplete touch action with a certain probability.

As shown in FIG. 2, the touch recognition method of the embodiment may include following steps 201 through 215.

At step 201, the first sub-region of the first type and the second sub-region of the second type in the first touch region are determined in advance or according to an operation of a user.

For example, a first type touch operation of the user in the first touch region may be detected, and a region in which the first type touch operation of the user occurs may be determined as the first sub-region of the first type, a second type touch operation of the user in the first touch region may be detected, and a region in which the second type touch operation of the user occurs may be determined as the second sub-region of the second type.

As an example, the first type touch operation of the user may be that with a small number of touch points and with a large area at each single touch point. For example, the region in which the first type touch operation of the user occurs may be a main stress region of the touch panel, thus the touch operation occurring in such region is given priority to be ignored mainly.

Moreover, as an example, the second type touch operation of the user may be that with a larger number of touch points and with a small area at each single touch point. For example, the region in which the second type touch operation of the user occurs may be a region of the touch panel not susceptible to force.

By taking the touch panel of the embodiment being a touch panel of a handhold terminal (e.g., mobile phone) as an example, for example, the first touch region may be located at an upper edge, a lower edge, a left edge or a right edge of the touch panel.

The touch panel of the embodiment may be a flexible touch panel, and since the flexible touch panel is flexible, the mistaken touch is prone to occur at an edge region of the flexible touch panel.

As an example, the first touch region of the embodiment may include a left edge region and a right edge region of the touch panel, and in accordance with operations of the user, the right edge region of the touch panel may be defined as the first sub-region, and the left edge region of the touch panel may be defined as the second sub-region.

For example, in a case where the user holds the handhold terminal by a right hand, the right edge region of the touch panel of the handhold terminal is a region in which the mistaken touch caused by a palm of the user is prone to occur, thus may be defined as the first sub-region, and the left edge region of the touch panel of the handhold terminal is a region in which the mistaken touch caused by a finger of the user is prone to occur, thus may be defined as the second sub-region. Generally, the region in which the mistaken touch caused by the palm of the user is prone to occur is the main stress region of the touch panel, the mistaken touch requiring no response and further processing is prone to occur in such region with a certain probability, and the region in which the mistaken touch caused by the finger of the user is prone to occur is the region of the touch panel not susceptible to force, the mistaken touch (i.e., the mistaken touch which cannot result in a user's expected response) resulting from the incomplete touch action is prone to occur in such region with a certain probability.

The handhold terminal may be provided with a sensor, and when the user first contacts the handhold terminal and touches the touch panel of the handhold terminal, the sensor can sense the touch of the user. For example, the sensor may be a pressure sensor, a photo-sensor, an ultrasonic sensor or the like, when the user holds the handhold terminal by a hand, the sensor senses different signals from the region in which the palm of the user touches and the region in which the finger of the user touches, thereby the region in which the palm of the user touches and the region in which the finger of the user touches are determined according to sensed signals.

Figure 3:
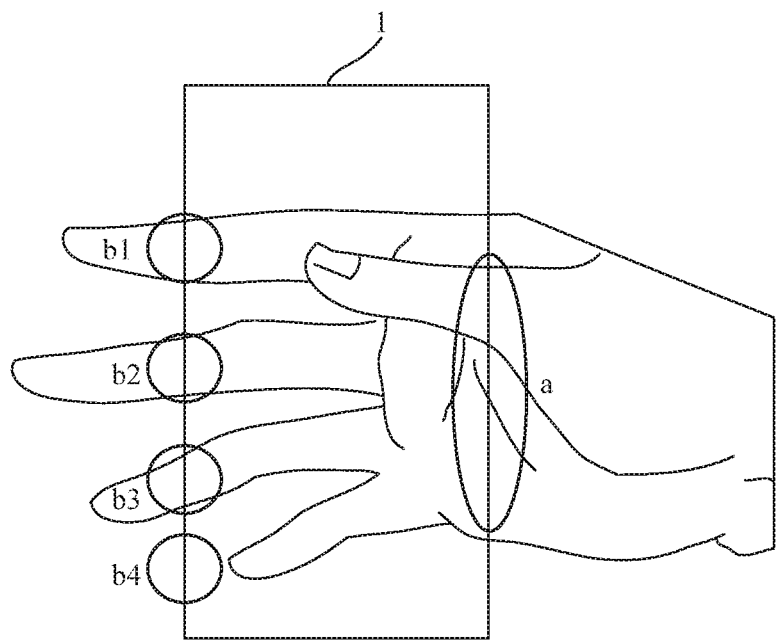
FIG. 3 shows a diagram of a touch region of a touch panel in an embodiment of the present disclosure.

By taking the user holding the handhold terminal by the right hand as example, a diagram of a touch region of a touch panel in an embodiment of the present disclosure is shown in FIG. 3. As shown in FIG. 3, when the user holds the handhold terminal by the right hand, a sensor at the right edge region of the touch panel 1 of the handhold terminal senses one first type touch point a and an area of the first type touch point a, a sensor at the left edge region of the touch panel 1 of the handhold terminal senses at least one second type touch point and an area of each of the at least one second type touch point, for example, the second type touch point may include at least one of points b1, b2, b3 and b4. The number of the second type touch points sensed by the sensor may vary according to a size of the hand of the user. For example, in a case where the hand of the user is relatively large, the sensor may sense four second type touch points b1, b2, b3 and b4, and in a case where the hand of the user is relatively small, the sensor may sense a number of second type touch points less than four.

For example, when the palm of the user touches the touch panel, a relatively large touch area and only one touch point may be generated, in a case where there is only one touch point and an area of the touch point sensed by the sensor is greater than a predefined threshold, the touch point is determined as one caused by a touch of the palm of the user, thus is determined as the first type touch point. Here, the predefined threshold may be, for example, an area of an icon of an application program, or an area obtained by expanding (e.g., expanding by 10%) the area of the icon of the application program appropriately.

When the finger of the user touches the touch panel, at least one touch point may be generated and each of the at least one touch point may have a relatively small area, in a case where at least one touch point is sensed and the area of each touch point sensed by the sensor is less than or equal to a predefined threshold, the at least one touch point is determined as one caused by touch of the finger of the user, thus are determined as second type touch point. Here, the predefined threshold may be, for example, an area of an icon of an application program, or an area obtained by narrowing (e.g., narrowing by 10%) the area of the icon of the application program appropriately.

Then, the region in which the first type touch point occurs is determined as the first sub-region according to a touch position of the first type touch point, and the region in which the second type touch point occurs is determined as the second sub-region according to a touch position of the second type touch point.

In the embodiment, the first sub-region may be defined as a region with a high probability of occurrence of the first type touch point, and the second sub-region may be determined as a region with a high probability of occurrence of the second type touch point.

In the embodiment, the determination of the first sub-region and the second sub-region is illustrated by only taking the user holding the handhold terminal by the right hand as example. Based on the description, it is predictable for ordinary skilled persons in the art the determination of the first sub-region and the second sub-region in a case where the user holds the handhold terminal by a left hand.

In practical applications, at step 201, positions of the first sub-region and the second sub-region may be defined according to an instruction input by the user. During an initialization of the handhold terminal, the user may be prompted to input the instruction to select whether the handhold terminal is hold by the right hand or the left hand, thereby the first sub-region and the second sub-region in the first touch region of the touch panel of the handhold terminal are determined.

In addition, in the embodiment, the first touch region, and the first sub-region and the second sub-region in the first touch region may be predefined by a manufacturer. Moreover, the first sub-region and the second sub-region may have different areas. For example, in a case where the first sub-region is the region easily to be touched mistakenly by the palm of the user and the second sub-region is the region easily to be touched mistakenly by fingers of the user, the area of the second sub-region may be greater than that of the first sub-region. As an example, a ratio of the area of the second sub-region to the area of the first sub-region may be greater than or equal to a predefined threshold (e.g., 1.5). Furthermore, the area of the first sub-region and the area of the second sub-region may be defined according to operations of the user.

At step 202, whether the position of the first touch is located in the first sub-region or the second sub-region of the first touch region is judged, and the step 203 is performed in response to the position of the first touch being located in the first sub-region of the first touch region, and the step 209 is performed in response to the position of the first touch being located in the second sub-region of the first touch region.

At step 203, whether the duration time of the first touch is greater than or equal to a first threshold is judged, the step 204 is performed in response to the duration time of the first touch being greater than or equal to the first threshold, and the step 205 is performed in response to the duration time of the first touch being less than the first threshold.

In the embodiment, the duration time of the first touch may be sensed by a sensor.

In the embodiment, most of touch operations occurring in the first sub-region are mistaken touches each caused by a pressure of the palm, thus the touch operations occurring in such region are given priority to be ignored mainly. The duration time of the first touch being greater than or equal to the first threshold, determined at step 203, indicates that the user may press the touch panel of the handhold terminal for a long time while holding the handhold terminal, thus the step 204 is performed.

In the embodiment, the first threshold may be predefined, or defined according to operations of the user during a subsequent application procedure. For example, the first threshold may be a time period obtained by appropriately extending (e.g., extending by 10%) a longest time period from the touch panel of the handhold terminal receiving a touch operation to a response being generated correspondingly.

At step 204, the first touch is determined as the mistaken touch.

No response and further processing is performed in response to the first touch being determined as the mistaken touch.

At step 205, whether a second touch occurs at the position of the first touch is detected during a first predefined period, the step 206 is performed in response to the second touch occurring at the position of the first touch during the first predefined period, and the step 207 is performed in response to the second touch not occurring at the position of the first touch during the first predefined period.

In some implementations, the first predefined period may be a time period ranging from 1s to 2s. The first predefined period may be defined in advance, or defined according to an operation of the user during a subsequent application procedure.

For example, the first predefined period may be a shortest interval between two successive touch operations of the user, or a time period obtained by appropriately extending (e.g., extending by 10%) the shortest interval between two successive touch operations of the user.

At step 206, the first touch is determined as the effective touch.

A touch response and further processing may be performed in response to the first touch being determined as the effective touch.

At step 207, a reminder signal is issued.

For example, the reminder signal may be issued through an application program or a display interface. As an example, the reminder signal may be a flicker of an icon, a sound signal, a vibration signal, or other signal capable of prompting the user. The reminder signal reminds the user to perform the second touch during a second predefined period.

At step 208, whether the second touch occurs at the position of the first touch during the second predefined period is detected, the step 206 is performed in response to the second touch occurring at the position of the first touch during the second predefined period, and the step 204 is performed in response to the second touch occurring at the position of the first touch during the second predefined period.

That is to say, the second touch occurring at the position of the first touch during the second predefined period indicates that the user performs the second touch during the second predefined period after receiving the reminder signal, thus the step 206 is performed, the second touch not occurring at the position of the first touch during the second predefined period indicates that the user does not perform the second touch during the second predefined period after receiving the reminder signal, thus the step 204 is performed.

In some implementations, the second predefined period may be a time period ranging from 1s to 2s. The second predefined period may be defined in advance or according to an operation of the user during a subsequent application procedure.

For example, the second predefined period may be a shortest time period from a time at which the user receives the reminder signal to a time at which the user performs the second touch, or a time period obtained by appropriately extending (e.g., extending by 10%) the shortest time period from the time at which the user receives the reminder signal to the time at which the user performs the second touch.

At step 209, whether a ratio of an area of the first touch to a predefined touch area is greater than or equal to the second threshold is judged, the step 210 is performed in response to the ratio of the area of the first touch to the predefined touch area being greater than or equal to the second threshold, and the step 212 is performed in response to the ratio of the area of the first touch to the predefined touch area being less than the second threshold.

In the embodiment, the predefined touch area may be defined in advance or defined according to an operation of the user during a subsequent application procedure. For example, the predefined touch area may be an area of an icon of an application program, or an area obtained by expanding (e.g., expanding by 10%) the area of the icon of the application program appropriately.

In some implementations, the second threshold may be 80%, and may be defined in advance or defined according to an operation of the user during a subsequent application procedure.

At step 210, whether the duration time of the first touch is greater than or equal to a third threshold and less than or equal to a fourth threshold is judged, the step 211 is performed in response to the duration time of the first touch being greater than or equal to the third threshold and less than or equal to the fourth threshold, and the step 204 is performed in response to the duration time of the first touch being less than the third threshold or greater than the fourth threshold.

In some implementations, the third threshold may be 0.5s, and the fourth threshold may be 2s. The third threshold and the fourth threshold may be defined in advance or according to operations of the user in a subsequent application procedure.

At step 211, the first touch is determined as the effective touch.

A touch response and further processing may be performed in response to the first touch being determined as the effective touch.

At step 212, whether the second touch occurs at the position of the first touch during the first predefined period is detected, the step 206 is performed in response to the second touch occurring at the position of the first touch during the first predefined period, and the step 213 is performed in response to the second touch not occurring at the position of the first touch during the first predefined period.

In some implementations, the first predefined period may be a time period ranging from 1s to 2s. The first predefined period may be defined in advance, or defined according to an operation of the user during a subsequent application procedure.

For example, the first predefined period may be a shortest interval between two successive touch operations of the user, or a time period obtained by appropriately extending (e.g., extending by 10%) the shortest interval between two successive touch operations of the user.

At step 213, a compensated area of the first touch is obtained by summing the area of the first touch with a predefined compensation area.

In the embodiment, the predefined compensation area may be defined in advance or according to an operation of the user during a subsequent application procedure.

For example, the predefined compensation area may be 10% of the area of the first touch.

In the embodiment, for example, most of touch operations in the second sub-region are mistaken touch caused by incomplete touch actions, in order to make the touch response in such region be accurate, the area of the first touch may be compensated in response to the ratio of the area of the first touch to the predefined touch area being less than the second threshold, and then whether the first touch is the effective touch or the mistaken touch is judged again.

At step 214, whether a ratio of the compensated area of the first touch to the predefined touch area is greater than or equal to the second threshold is judged, the step 215 is performed in response to the ratio of the compensated area of the first touch to the predefined touch area being greater than or equal to the second threshold, and the step 204 is performed in response to the ratio of the compensated area of the first touch to the predefined touch area being less than the second threshold.

At step 215, the reminder signal is issued and whether the second touch occurs at the position of the first touch during the second predefined period is detected, the step 206 is performed in response to the second touch occurring at the position of the first touch during the second predefined period, and the step 204 is performed in response to the second touch not occurring at the position of the first touch during the second predefined period.

The second touch occurring at the position of the first touch during the second predefined period indicates that the user performs the second touch during the second predefined period after receiving the reminder signal, thus the step 206 is performed, in such way, the mistaken touch caused by the incomplete touch action is corrected. The second touch not occurring at the position of the first touch during the second predefined period indicates that the user does not perform the second touch during the second predefined period after receiving the reminder signal, thus the step 204 is performed.

In some implementations, the second predefined period may be a time period ranging from 1s to 2s. The second predefined period may be defined in advance or according to an operation of the user during a subsequent application procedure.

For example, the second predefined period may be a shortest time period from a time at which the user receives the reminder signal to a time at which the user performs the second touch, or a time period obtained by appropriately extending (e.g., extending by 10%) the shortest time period from the time at which the user receives the reminder signal to the time at which the user performs the second touch.

In the embodiment, a response or further processing may be performed according to the first touch in response to the first touch being determined as the effective touch, for example, a brightness of a screen or a volume may be adjusted, or an application may be started according to the first touch. No response or further processing would be performed in response to the first touch being determined as the mistaken touch.

With the touch recognition method of the embodiment, in response to the position of the first touch being located in the first sub-region or the second sub-region of the region (i.e., the first touch region) in which the mistaken touch is prone to occur, the parameter of the first touch is selected based on the type of the first sub-region or the second sub-region, and whether the first touch is the mistaken touch or the effective touch is judged according to the parameter of the first touch by a corresponding mode, an accuracy of touch response in the region of the touch panel in which the mistaken touch is prone to occur is improved, thereby the user's interactive experience during using the touch panel is improved.

It should be understood that, at the step 202, whether the position of the first touch is located in the second touch region may be judged, and the first touch may be determined as the effective touch in response to the position of the first touch being located in the second touch region. In addition, the steps 207 and 208, the step 210, or the steps 213 through 215 may be omitted. However, in a case where the touch recognition method of the embodiment includes the steps 207 and 208, the step 210, and the steps 213 through 215, the accuracy of touch response in the region of the touch panel in which the mistaken touch is prone to occur is improved better.

Figure 4:
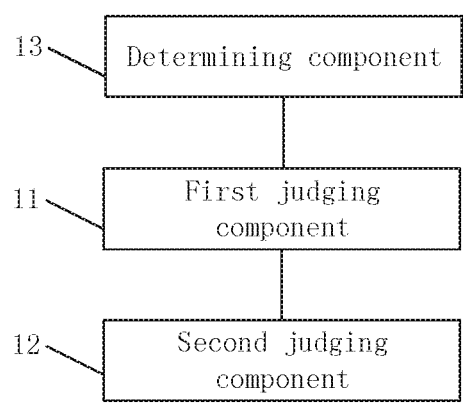
FIG. 4 shows a structural diagram of a touch device in an embodiment of the present disclosure.

FIG. 4 shows a structural diagram of a touch device in an embodiment of the present disclosure. As shown in FIG. 4, the touch device includes a touch panel, and the touch panel includes a first touch region. The first touch region may be located at an edge of the touch panel. For example, the first touch region is a region in which a mistaken touch is prone to occur. A type of the first touch region may be determined according to a type of the mistaken touch prone to occur in the first touch region.

The touch panel of the embodiment may be a touch display panel.

The touch device further includes a first judging component 11 and a second judging component 12.

The first judging component 11 is configured to judge whether a position of a first touch is located in the first touch region.

The second judging component 12 is configured to, in response to the first judging component 11 determining that the position of the first touch is located in the first touch region, judge whether the first touch is a mistaken touch or an effective touch according to a type of the first touch region and a parameter of the first touch selected based on the type of the first touch region.

The parameter of the first touch may include at least one of a duration time of the first touch and an area of the first touch.

In the embodiment, the parameter of the first touch for judging whether the first touch is the mistaken touch or the effective touch may be selected according to the type of the first touch region.

For example, the type of the mistaken touch prone to occur in the first touch region may be that requiring no response and further processing with a certain probability, or resulting from an incomplete touch action with a certain probability, and the type of the first touch region may be determined according to the type of the mistaken touch prone to occur in the first touch region, the parameter of the first touch is further selected correspondingly and whether the first touch is the mistaken touch or the effective touch is further judged according the parameter of the first touch.

In some implementations, the touch device may further include a determining component 13 configured to determine the type of the first touch region in advance or according to an operation of a user.

For example, the determining component 13 may be configured to detect a type of the operation of the user in the first touch region, and determine the type of the first touch region according to the type of the operation of the user in the first touch region.

In some implementations, the touch panel may further include a second touch region different from the first touch region, the first judging component 11 of the touch device of the embodiment may be further configured to judge whether the position of the first touch is located in the second touch region, and the second judging component 12 may be configured to, in response to the position of the first touch being located in the second touch region, determine the first touch as the effective touch.

The second touch region may be located at a center of the touch panel.

The touch device of the embodiment can achieve the touch recognition method in accordance with the embodiment of the present disclosure.

With the touch device of the embodiment, in response to the position of the first touch being located in the region (i.e., the first touch region) in which the mistaken touch is prone to occur, whether the first touch is the mistaken touch or the effective touch is judged according to the type of the first touch region and the parameter of the first touch selected based on the type of the first touch region, an accuracy of touch response in the region of the touch panel in which the mistaken touch is prone to occur is improved, thereby the user's interactive experience during using the touch panel is improved.

It should be understood that, a corresponding response and further processing may be performed in response to the first touch being determined as the effective touch, and no response and further processing would be performed in response to the first touch being determined as the mistaken touch.

In addition, with the touch device of the embodiment, in response to the position of the first touch being located in a region (i.e., the second touch region) in which no mistaken touch is prone to occur, the first touch is determined as the effective touch, and the corresponding response and further processing may be performed, a speed of touch response in the region of the touch panel in which no mistaken touch is prone to occur is ensured, thereby the user's interactive experience during using the touch panel is improved.

Figure 5:
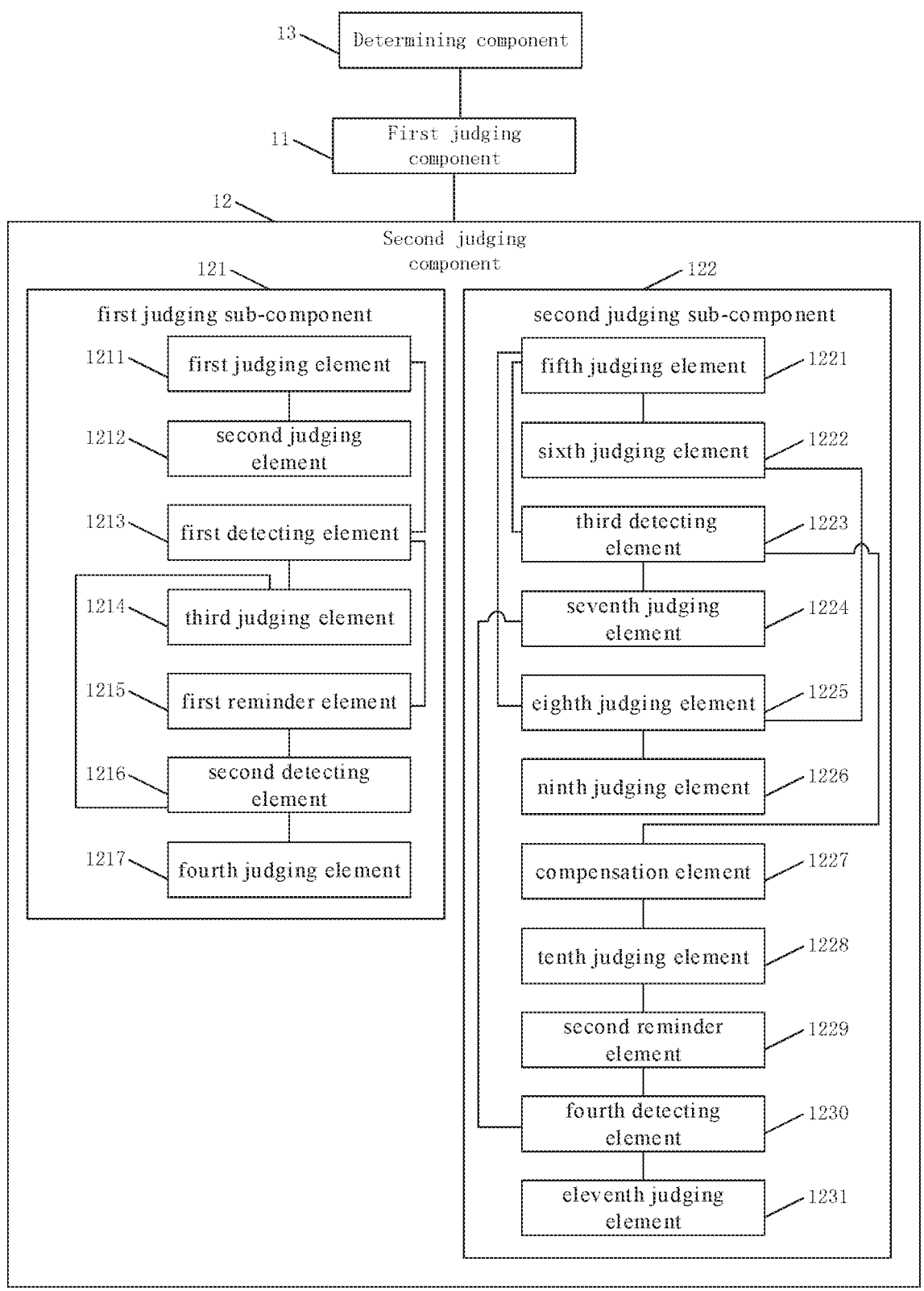
FIG. 5 shows a structural diagram of a touch device in an embodiment of the present disclosure.

FIG. 5 shows a structural diagram of a touch device in an embodiment of the present disclosure. In the embodiment, the first touch region of the touch panel includes a first sub-region of a first type and a second sub-region of a second type, the first type is different from the second type. For example, the type of the mistaken touch prone to occur in the first sub-region may be that requiring no response and further processing with a certain probability, and the type of the mistaken touch prone to occur in the second sub-region may be that resulting from an incomplete touch action with a certain probability.

As shown in FIG. 5, the second judging component 12 of the touch device of the embodiment may include a first judging sub-component 121 and a second judging sub-component 122. The first judging component 11 is configured to judge whether the position of the first touch is located in the first sub-region or the second sub-region of the first touch region. The first judging sub-component 121 is configured to, in response to the first judging component 11 determining the position of the first touch being located in the first sub-region, select the parameter of the first touch according to the type of the first sub-region and judge whether the first touch is the mistaken touch or the effective touch according to the parameter of the first touch by a first mode. The second judging sub-component 122 is configured to, in response to the first judging component 11 determining the position of the first touch being located in the second sub-region, select the parameter of the first touch according to the type of the second sub-region and judge whether the first touch is the mistaken touch or the effective touch according to the parameter of the first touch by a second mode.

In the embodiment, the determining component 13 may be configured to determine the first sub-region of the first type and the second sub-region of the second type of the first touch region in advance or according to the operation of the user.

For example, the determining component 13 may be configured to detect a first type touch operation of a user in the first touch region, and determine a region in which the first type touch operation of the user occurs as the first sub-region of the first type, and detect a second type touch operation of the user in the first touch region, and determine a region in which the second type touch operation of the user occurs as the second sub-region of the second type.

In the embodiment, the first judging sub-component 121 may further include a first judging element 1211, a second judging element 1212, a first detecting element 1213 and a third judging element 1214. The first judging element 1211 is configured to judge whether a duration time of the first touch is greater than or equal to a first threshold. The second judging element 1212 is configured to, in response to the first judging element 1211 determining the duration time of the first touch being greater than or equal to the first threshold, determine the first touch as the mistaken touch. The first detecting element 1213 is configured to, in response to the first judging element 1211 determining the duration time of the first touch being less than the first threshold, detect whether a second touch occurs at the position of the first touch during a first predefined period. The third judging element 1214 is configured to, in response to the second touch occurring at the position of the first touch during the first predefined period, determine the first touch as the effective touch, and in response to the second touch not occurring at the position of the first touch during the first predefined period, determine the first touch as the mistaken touch.

In the embodiment, the first judging sub-component 121 may further include a first reminder element 1215, a second detecting element 1216 and a fourth judging element 1217. The first reminder element 1215 is configured to, in response to the second touch not occurring at the position of the first touch during the first predefined period, issue a reminder signal. The second detecting element 1216 is configured to detect whether the second touch occurs at the position of the first touch during a second predefined period subsequent to the reminder signal. The third judging element 1214 is triggered to determine the first touch as the mistaken touch in response to the second touch not occurring at the position of the first touch during the second predefined period. The fourth judging element 1217 is configured to determine the first touch as the effective touch in response to the second touch occurring at the position of the first touch during the second predefined period subsequent to the reminder signal.

In the embodiment, the second judging sub-component 122 may further include a fifth judging element 1221, a sixth judging element 1222, a third detecting element 1223 and a seventh judging element 1224. The fifth judging element 1221 is configured to judge whether a ratio of an area of the first touch to a predefined touch area is greater than or equal to a second threshold. The sixth judging element 1222 is configured to, in response to the ratio of the area of the first touch to the predefined touch area being greater than or equal to the second threshold, determine the first touch as the effective touch. The third detecting element 1223 is configured to, in response to the ratio of the area of the first touch to the predefined touch area being less than the second threshold, detect whether the second touch occurs at the position of the first touch during a first predefined period. The seventh judging element 1224 is configured to, in response to the second touch occurring at the position of the first touch during the first predefined period, determine the first touch as the effective touch, and in response to the second touch not occurring at the position of the first touch during the first predefined period, determine the first touch as the mistaken touch.

In the embodiment, the second judging sub-component 122 may further include an eighth judging element 1225 and a ninth judging element 1226. The eighth judging element 1225 is configured to, in response to the ratio of the area of the first touch to the predefined touch area being greater than or equal to the second threshold, judge whether the duration time of the first touch is greater than or equal to a third threshold, and less than or equal to a fourth threshold. The sixth judging element 1222 is triggered to determine the first touch as the effective touch in response to the duration time of the first touch being greater than or equal to the third threshold, and less than or equal to the fourth threshold. The ninth element 1226 is configured to determine the first touch as the mistaken touch in response to the duration time of the first touch being less than the third threshold or greater than the fourth threshold.

In the embodiment, the second judging sub-component 122 may further include a compensation element 1227, a tenth judging element 1228, a second reminder element 1229, a fourth detecting element 1230 and an eleventh judging element 1231. The compensation element 1227 is configured to sum the area of the first touch with a predefined compensation area to obtain a compensated area of the first touch in response to the second touch not occurring at the position of the first touch during the first predefined period. The tenth judging element 1228 is configured to judge whether a ratio of the compensated area of the first touch to the predefined touch area is greater than or equal to the second threshold. The second reminder element 1229 is configured to issue the reminder signal in response to the ratio of the compensated area of the first touch to the predefined touch area being greater than or equal to the second threshold. The fourth detecting element 1230 is configured to detect whether the second touch occurs at the position of the first touch during a second predefined period subsequent to the reminder signal. The seventh judging element 1224 is triggered to determine the first touch as the mistaken touch in response to the second touch not occurring at the position of the first touch during the second predefined period. The eleventh judging element 1231 is configured to determine the first touch as the effective touch in response to the second touch occurring at the position of the first touch during the second predefined period.

The touch device of the embodiment can achieve the touch recognition method in accordance with the embodiment of the present disclosure.

Other details related in this embodiment may refer to the description of the touch recognition method in accordance with the embodiment of the present disclosure.

It should be noted that, elements or components in the embodiment may be implemented separately, or a portion thereof may be integrated together.

With the touch device of the embodiment, in response to the position of the first touch being located in the first sub-region or the second sub-region of the region (i.e., the first touch region) in which the mistaken touch is prone to occur, the parameter of the first touch is selected based on the type of the first sub-region or the second sub-region, and whether the first touch is the mistaken touch or the effective touch is judged according to the parameter of the first touch by a corresponding mode, an accuracy of touch response in the region of the touch panel in which the mistaken touch is prone to occur is improved, thereby the user's interactive experience during using the touch panel is improved.

An embodiment of the present disclosure further provides a terminal apparatus including the touch device in accordance with the embodiment of the present disclosure.

In some implementations, the touch panel in the embodiment of the present disclosure may be a flexible touch display panel, such as a flexible OLED touch display panel or a flexible liquid crystal touch display panel. In the embodiment, the touch panel may be a touch display panel with a narrow bezel or no bezel.

In the embodiment, the terminal apparatus may be a handhold terminal such as a mobile phone.

An embodiment of the present disclosure further provides a non-temporary computer readable storage medium which stores a program including executable instructions, the program is executed to perform the touch recognition method in accordance with the embodiment of the present disclosure.

An embodiment of the present disclosure further provides a touch recognition apparatus, including a storage device and a processor, the storage device stores a program including executable instructions, and the program is executed by the processor to perform the touch recognition method in accordance with the embodiment of the present disclosure.

It should be understood that, the steps of the embodiment of the present disclosure may be performed in an order different from that illustrated, as long as corresponding technical effects and functions can be achieved.

It should be noted that, devices, components, elements and apparatuses in embodiments and implementations of the present disclosure may be implemented by a software, a hardware or a combination thereof, the hardware may include a computer, a processor, a storage device, a circuit or the like. Thresholds related in embodiments and implementations of the present disclosure may be defined and adjusted as required. Touches and parameters of the touches related in embodiments and implementations of the present disclosure may be sensed by a sensor, a meter or the like.

Moreover, it should be noted that, without mutually exclusion, features in embodiments and implementations of the present disclosure may be combined arbitrarily, some features in embodiments and implementations of the present disclosure may be omitted, and more features than those illustrated may be included in embodiments and implementations of the present disclosure.

It should be understood that, the above embodiments and implementations are merely exemplary embodiments for explaining principle of technical solutions of the present disclosure, but the present disclosure is not limited thereto. Various modifications, variants and equivalent replacements may be made by those ordinary skilled in the art without departing from the concept of the present disclosure, these modifications, variants and equivalent replacements all fall into the protection scope of the present disclosure.

The invention claimed is:

1. A touch recognition method for a touch panel comprising a first touch region, the method comprising:
    judging whether a position of a first touch is located in the first touch region; and
    in response to the position of the first touch being located in the first touch region, judging whether the first touch is a mistaken touch or an effective touch according to a type of the first touch region and a parameter of the first touch selected based on the type of the first touch region,
    wherein the first touch region comprises a first sub-region of a first type and a second sub-region of a second type, the first type is different from the second type, in response to the position of the first touch being located in the first sub-region of the first touch region, whether the first touch is the mistaken touch or the effective touch is judged according to the parameter of the first touch by a first mode, and in response to the position of the first touch being located in the second sub-region of the first touch region, whether the first touch is the mistaken touch or the effective touch is judged according to the parameter of the first touch by a second mode, and the first mode is different from the second mode, and wherein the parameter of the first touch includes a duration time of the first touch and an area of the first touch, in response to the position of the first touch being located in the second sub-region of the first touch region, judging whether the first touch is the mistaken touch or the effective touch according to the parameter of the first touch by the second mode comprising:

judging whether a ratio of the area of the first touch to a predefined touch area is greater than or equal to a second threshold;

in response to the ratio of the area of the first touch to the predefined touch area being greater than or equal to the second threshold, judging whether the duration time of the first touch is greater than or equal to a third threshold, and less than or equal to a fourth threshold;

in response to the duration time of the first touch being greater than or equal to the third threshold, and less than or equal to the fourth threshold, determining the first touch as the effective touch;

in response to the duration time of the first touch being less than the third threshold or greater than the fourth threshold, determining the first touch as the mistaken touch;

in response to the ratio of the area of the first touch to the predefined touch area being less than the second threshold, detecting whether the second touch occurs at the position of the first touch during a first predefined period;

in response to the second touch occurring at the position of the first touch during the first predefined period, determining the first touch as the effective touch; and in response to the second touch not occurring at the position of the first touch during the first predefined period, summing the area of the first touch with a predefined compensation area to obtain a compensated area of the first touch;

judging whether the ratio of the compensated area of the first touch to the predefined touch area is greater than or equal to the second threshold;

in response to the ratio of the compensated area of the first touch to the predefined touch area being greater than or equal to the second threshold, issuing a reminder signal;

detecting whether the second touch occurs at the position of the first touch during a second predefined period subsequent to the reminder signal;

in response to the second touch occurring at the position of the first touch during the second predefined period, determining the first touch as the effective touch; and in response to the second touch not occurring at the position of the first touch during the second predefined period, determining the first touch as the mistaken touch.

2. The method of claim 1, wherein the first touch region is located at an edge of the touch panel.

3. The method of claim 1, wherein the parameter of the first touch includes the duration time of the first touch, in response to the position of the first touch being located in the first sub-region of the first touch region, judging whether the first touch is the mistaken touch or the effective touch according to the parameter of the first touch by the first mode comprising:

judging whether the duration time of the first touch is greater than or equal to a first threshold, in response to the duration time of the first touch being greater than or equal to the first threshold, determining the first touch as the mistaken touch;

in response to the duration time of the first touch being less than the first threshold, detecting whether a second touch occurs at the position of the first touch during the first predefined period, in response to the second touch occurring at the position of the first touch during the first predefined period, determining the first touch as the effective touch, and in response to the second touch not occurring at the position of the first touch during the first predefined period, determining the first touch as the mistaken touch.

4. The method of claim 1, wherein the parameter of the first touch includes the duration time of the first touch, in response to the position of the first touch being located in the first sub-region of the first touch region, judging whether the first touch is the mistaken touch or the effective touch according to the parameter of the first touch by the first mode comprising:

judging whether the duration time of the first touch is greater than or equal to a first threshold, in response to the duration time of the first touch being greater than or equal to the first threshold, determining the first touch as the mistaken touch;

in response to the duration time of the first touch being less than the first threshold, detecting whether a second touch occurs at the position of the first touch during the first predefined period, in response to the second touch occurring at the position of the first touch during the first predefined period, determining the first touch as the effective touch, and in response to the second touch not occurring at the position of the first touch during the first predefined period, issuing a reminder signal;

detecting whether the second touch occurs at the position of the first touch during the second predefined period subsequent to the reminder signal, in response to the second touch occurring at the position of the first touch during the second predefined period subsequent to the reminder signal, determining the first touch as the effective touch, and in response to the second touch not occurring at the position of the first touch during the second predefined period, determining the first touch as the mistaken touch.

5. The method of claim 1, wherein the parameter of the first touch includes the area of the first touch, in response to the position of the first touch being located in the second sub-region of the first touch region, judging whether the first touch is the mistaken touch or the effective touch according to the parameter of the first touch by the second mode comprising:

judging whether the ratio of the area of the first touch to the predefined touch area is greater than or equal to the second threshold;

in response to the ratio of the area of the first touch to the predefined touch area being greater than or equal to the second threshold, determining the first touch as the effective touch;

in response to the ratio of the area of the first touch to the predefined touch area being less than the second threshold, detecting whether the second touch occurs at the position of the first touch during the first predefined period;

in response to the second touch occurring at the position of the first touch during the first predefined period, determining the first touch as the effective touch; and in response to the second touch not occurring at the position of the first touch during the first predefined period, determining the first touch as the mistaken touch.

6. The method of claim 1, wherein the parameter of the first touch includes the duration time of the first touch and the area of the first touch, in response to the position of the first touch being located in the second sub-region of the first touch region, judging whether the first touch is the mistaken touch or the effective touch according to the parameter of the first touch by the second mode comprising:

judging whether the ratio of the area of the first touch to the predefined touch area is greater than or equal to the second threshold;

in response to the ratio of the area of the first touch to the predefined touch area being greater than or equal to the second threshold, judging whether the duration time of the first touch is greater than or equal to the third threshold, and less than or equal to the fourth threshold;

in response to the duration time of the first touch being greater than or equal to the third threshold, and less than or equal to the fourth threshold, determining the first touch as the effective touch;

in response to the duration time of the first touch being less than the third threshold or greater than the fourth threshold, determining the first touch as the mistaken touch;

in response to the ratio of the area of the first touch to the predefined touch area being less than the second threshold, detecting whether the second touch occurs at the position of the first touch during the first predefined period;

in response to the second touch occurring at the position of the first touch during the first predefined period, determining the first touch as the effective touch; and in response to the second touch not occurring at the position of the first touch during the first predefined period, determining the first touch as the mistaken touch.

7. The method of claim 1, wherein the parameter of the first touch includes the area of the first touch, in response to the position of the first touch being located in the second sub-region of the first touch region, judging whether the first touch is the mistaken touch or the effective touch according to the parameter of the first touch by the second mode comprising:

judging whether the ratio of the area of the first touch to the predefined touch area is greater than or equal to the second threshold;

in response to the ratio of the area of the first touch to the predefined touch area being greater than or equal to the second threshold, determining the first touch as the effective touch;

in response to the ratio of the area of the first touch to the predefined touch area being less than the second threshold, detecting whether the second touch occurs at the position of the first touch during the first predefined period;

in response to the second touch occurring at the position of the first touch during the first predefined period, determining the first touch as the effective touch;

in response to the second touch not occurring at the position of the first touch during the first predefined period, summing the area of the first touch with the predefined compensation area to obtain the compensated area of the first touch;

judging whether the ratio of the compensated area of the first touch to the predefined touch area is greater than or equal to the second threshold;

in response to the ratio of the compensated area of the first touch to the predefined touch area being greater than or equal to the second threshold, issuing the reminder signal;

detecting whether the second touch occurs at the position of the first touch during the second predefined period subsequent to the reminder signal;

in response to the second touch occurring at the position of the first touch during the second predefined period, determining the first touch as the effective touch;

in response to the second touch not occurring at the position of the first touch during the second predefined period, determining the first touch as the mistaken touch.

8. The method of claim 1, wherein the type of the first touch region is determined according to an operation of a user, and determining the type of the first touch region according to the operation of the user comprising:

detecting a type of the operation of the user in the first touch region, and determining the type of the first touch region according to the type of the operation of the user in the first touch region.

9. The method of claim 1, wherein the first sub-region of the first type and the second sub-region of the second type of the first touch region are determined according to an operation of the user, and determining the first sub-region of the first type and the second sub-region of the second type of the first touch region according to the operation of the user comprising:

detecting a first type touch operation of the user in the first touch region, and determining a region in which the first type touch operation of the user occurs as the first sub-region of the first type; and detecting a second type touch operation of the user in the first touch region, and determining a region in which the second type touch operation of the user occurs as the second sub-region of the second type.

10. The method of claim 1, wherein the touch panel further comprises a second touch region different from the first touch region, the method further comprising:

judging whether the position of the first touch is located in the second touch region; and in response to the position of the first touch being located in the second touch region, determining the first touch as the effective touch.

11. A touch device, comprising:

a touch panel comprising a first touch region;

a first judging component configured to judge whether a position of a first touch is located in the first touch region; and a second judging component configured to, in response to the first judging component determining that the position of the first touch is located in the first touch region, judge whether the first touch is a mistaken touch or an effective touch according the type of the first touch region, wherein the first touch region comprises a first sub-region of a first type and a second sub-region of a second type, the first type is different from the second type, and the second judging component is configured to:

in response to the position of the first touch being located in the first sub-region of the first touch region, judge whether the first touch is the mistaken touch or the effective touch according to the parameter of the first touch by a first mode, in response to the position of the first touch being located in the second sub-region of the first touch region, judge whether the first touch is the mistaken touch or the effective touch according to the parameter of the first touch by a second mode, and the first mode is different from the second mode, and wherein the parameter of the first touch comprises a duration time of the first touch and an area of the first touch, the second judging component is configured to:

in response to the position of the first touch being located in the second sub-region of the first touch region, judge whether a ratio of the area of the first touch to a predefined touch area is greater than or equal to a second threshold;

in response to the ratio of the area of the first touch to the predefined touch area being greater than or equal to the second threshold, judge whether the duration time of the first touch is greater than or equal to a third threshold, and less than or equal to a fourth threshold;

in response to the duration time of the first touch being greater than or equal to the third threshold, and less than or equal to the fourth threshold, determine the first touch as the effective touch;

in response to the duration time of the first touch being less than the third threshold or greater than the fourth threshold, determine the first touch as the mistaken touch;

in response to the ratio of the area of the first touch to the predefined touch area being less than the second threshold, detect whether the second touch occurs at the position of the first touch during a first predefined period;

in response to the second touch occurring at the position of the first touch during the first predefined period, determine the first touch as the effective touch; and in response to the second touch not occurring at the position of the first touch during the first predefined period, sum the area of the first touch with a predefined compensation area to obtain a compensated area of the first touch;

judge whether the ratio of the compensated area of the first touch to the predefined touch area is greater than or equal to the second threshold;

in response to the ratio of the compensated area of the first touch to the predefined touch area being greater than or equal to the second threshold, issue a reminder signal;

detect whether the second touch occurs at the position of the first touch during a second predefined period subsequent to the reminder signal;

in response to the second touch occurring at the position of the first touch during the second predefined period, determine the first touch as the effective touch; and in response to the second touch not occurring at the position of the first touch during the second predefined period, determine the first touch as the mistaken touch.

12. The touch device of claim 11, wherein the parameter of the first touch comprises the duration time of the first touch, the second judging component is configured to:

in response to the position of the first touch being located in the first sub-region of the first touch region, judge whether the duration time of the first touch is greater than or equal to a first threshold, in response to the duration time of the first touch being greater than or equal to the first threshold, determine the first touch as the mistaken touch;

in response to the duration time of the first touch being less than the first threshold, detect whether a second touch occurs at the position of the first touch during the first predefined period, in response to the second touch occurring at the position of the first touch during the first predefined period, determine the first touch as the effective touch, and in response to the second touch not occurring at the position of the first touch during the first predefined period, determine the first touch as the mistaken touch.

13. The touch device of claim 11, wherein the parameter of the first touch comprises the duration time of the first touch, the second judging component is configured to:

in response to the position of the first touch being located in the first sub-region of the first touch region, judge whether the duration time of the first touch is greater than or equal to a first threshold, in response to the duration time of the first touch being greater than or equal to the first threshold, determine the first touch as the mistaken touch;

in response to the duration time of the first touch being less than the first threshold, detect whether a second touch occurs at the position of the first touch during the first predefined period, in response to the second touch occurring at the position of the first touch during the first predefined period, determine the first touch as the effective touch, and in response to the second touch not occurring at the position of the first touch during the first predefined period, issue a reminder signal;

detect whether the second touch occurs at the position of the first touch during the second predefined period subsequent to the reminder signal, in response to the second touch occurring at the position of the first touch during the second predefined period subsequent to the reminder signal, determine the first touch as the effective touch, and in response to the second touch not occurring at the position of the first touch during the second predefined period, determine the first touch as the mistaken touch.

14. The touch device of claim 11, wherein the parameter of the first touch comprises the area of the first touch, the second judging component is configured to:

in response to the position of the first touch being located in the second sub-region of the first touch region, judge whether the ratio of the area of the first touch to the predefined touch area is greater than or equal to the second threshold;

in response to the ratio of the area of the first touch to the predefined touch area being greater than or equal to the second threshold, determine the first touch as the effective touch;

in response to the ratio of the area of the first touch to the predefined touch area being less than the second threshold, detect whether the second touch occurs at the position of the first touch during the first predefined period;

in response to the second touch occurring at the position of the first touch during the first predefined period, determine the first touch as the effective touch; and in response to the second touch not occurring at the position of the first touch during the first predefined period, determine the first touch as the mistaken touch.

15. The touch device of claim 11, wherein the parameter of the first touch includes the duration time of the first touch and the area of the first touch, the second judging component is configured to:
   in response to the position of the first touch being located in the second sub-region of the first touch region, judge whether the ratio of the area of the first touch to the predefined touch area is greater than or equal to the second threshold;
   in response to the ratio of the area of the first touch to the predefined touch area being greater than or equal to the second threshold, judge whether the duration time of the first touch is greater than or equal to the third threshold, and less than or equal to the fourth threshold;
   in response to the duration time of the first touch being greater than or equal to the third threshold, and less than or equal to the fourth threshold, determine the first touch as the effective touch;
   in response to the duration time of the first touch being less than the third threshold or greater than the fourth threshold, determine the first touch as the mistaken touch;
   in response to the ratio of the area of the first touch to the predefined touch area being less than the second threshold, detect whether the second touch occurs at the position of the first touch during the first predefined period;
   in response to the second touch occurring at the position of the first touch during the first predefined period, determine the first touch as the effective touch; and
   in response to the second touch not occurring at the position of the first touch during the first predefined period, determine the first touch as the mistaken touch.

16. The touch device of claim 11, wherein the parameter of the first touch includes the area of the first touch, the second judging component is configured to:
   in response to the position of the first touch being located in the second sub-region of the first touch region, judge whether the ratio of the area of the first touch to the predefined touch area is greater than or equal to the second threshold;
   in response to the ratio of the area of the first touch to the predefined touch area being greater than or equal to the second threshold, determine the first touch as the effective touch;
   in response to the ratio of the area of the first touch to the predefined touch area being less than the second threshold, detect whether the second touch occurs at the position of the first touch during the first predefined period;
   in response to the second touch occurring at the position of the first touch during the first predefined period, determine the first touch as the effective touch;
   in response to the second touch not occurring at the position of the first touch during the first predefined period, sum the area of the first touch with the predefined compensation area to obtain the compensated area of the first touch;
   judge whether the ratio of the compensated area of the first touch to the predefined touch area is greater than or equal to the second threshold;
   in response to the ratio of the compensated area of the first touch to the predefined touch area being greater than or equal to the second threshold, issue the reminder signal;
   detect whether the second touch occurs at the position of the first touch during the second predefined period subsequent to the reminder signal;
   in response to the second touch occurring at the position of the first touch during the second predefined period, determine the first touch as the effective touch;
   in response to the second touch not occurring at the position of the first touch during the second predefined period, determine the first touch as the mistaken touch.

* * * * *